United States Patent
Dupraz (10) Patent No.: US 10,177,706 B2
(45) Date of Patent: Jan. 8, 2019

(54) METHOD AND DEVICE FOR REGULATING THE SUPPLY OF A PHOTOVOLTAIC CONVERTER

(71) Applicant: Alstom Technology Ltd., Baden (CH)

(72) Inventor: Jean-Pierre Dupraz, Bressolles (FR)

(73) Assignee: ALSTOM TECHNOLOGY LTD, Baden (CH)

( * ) Notice: Subject to any disclaimer, the term of this patent is extended or adjusted under 35 U.S.C. 154(b) by 148 days.

(21) Appl. No.: 14/911,870

(22) PCT Filed: Aug. 11, 2014

(86) PCT No.: PCT/EP2014/067141
§ 371 (c)(1),
(2) Date: Feb. 12, 2016

(87) PCT Pub. No.: WO2015/022281
PCT Pub. Date: Feb. 19, 2015

(65) Prior Publication Data
US 2016/0197578 A1   Jul. 7, 2016

(30) Foreign Application Priority Data

Aug. 13, 2013 (FR) ..................... 13 57975

(51) Int. Cl.
*H02S 40/32* (2014.01)
*H02S 50/00* (2014.01)
*G05F 1/67* (2006.01)

(52) U.S. Cl.
CPC ............... *H02S 40/32* (2014.12); *G05F 1/67* (2013.01); *H02S 50/00* (2013.01); *Y02E 10/58* (2013.01)

(58) Field of Classification Search
CPC .......... H02S 40/32; H02S 50/00; H02S 40/30; H02S 40/00; H02S 50/10; G05F 1/67;
(Continued)

(56) References Cited

U.S. PATENT DOCUMENTS 7,359,647 B1   4/2008 Faria
8,039,730 B2 *  10/2011 Hadar ............... H01L 31/02021
                                                    136/243
(Continued)

FOREIGN PATENT DOCUMENTS

CN   1064949 A      9/1992
CN   102270850 A   12/2011
(Continued)

OTHER PUBLICATIONS

Search Report issued in French Patent Application No. FR 13 57975 dated Apr. 25, 2014.
(Continued)

*Primary Examiner* — Que T Le
*Assistant Examiner* — Jennifer Bennett
(74) *Attorney, Agent, or Firm* — Pearne & Gordon LLP (57) ABSTRACT

A device for regulating the supply to a photovoltaic converter, the device comprising: a laser source (2); a photovoltaic converter (6) that feeds a DC-DC converter (8); circuit (100) for regulating the input impedance of said DC-DC converter (8) as a function of the operating voltage ($U_s$) of the photovoltaic converter (6) and of its no-load voltage ($U_{s0}$); and circuit (42) for measuring an output voltage of the DC-DC converter (8) and for producing a regulation signal (SR) for regulating the laser source.

21 Claims, 6 Drawing Sheets

(58) Field of Classification Search
CPC .. G05F 1/66; Y02E 10/58; Y02E 10/56; G01J 1/44; H02J 50/30; H02J 50/40; H02J 50/80; H02J 50/90
See application file for complete search history.

(56) References Cited

U.S. PATENT DOCUMENTS

| | | | | |
|---|---|---|---|---|
| 9,154,032 | B1* | 10/2015 | Beijer | G05F 1/67 |
| 2005/0269997 | A1* | 12/2005 | Usui | H02M 1/4225 |
| | | | | 323/207 |
| 2009/0016715 | A1 | 1/2009 | Furey | |
| 2011/0298305 | A1 | 12/2011 | Chisenga et al. | |
| 2012/0206064 | A1* | 8/2012 | Archenhold | H05B 33/0812 |
| | | | | 315/297 |
| 2015/0002977 | A1 | 1/2015 | Dupraz | |
| 2015/0348718 | A1 | 12/2015 | Aeschbach | |

FOREIGN PATENT DOCUMENTS

| | | |
|---|---|---|
| CN | 102570830 A | 7/2012 |
| CN | 102981549 A | 3/2013 |

OTHER PUBLICATIONS

International Search Report issued in Application No. PCT/EP2014/067141 dated Nov. 17, 2014.
Written Opinion issued in Application No. PCT/EP2014/067141 dated Nov. 17, 2014.
First Office Action and Search issued in connection with corresponding CN Application No. 201480053864.8 dated May 24, 2017.

\* cited by examiner

METHOD AND DEVICE FOR REGULATING THE SUPPLY OF A PHOTOVOLTAIC CONVERTER

TECHNICAL FIELD AND PRIOR ART

The invention relates to a method and a device for regulating the power supply to a photovoltaic converter.

By way of example, a photovoltaic converter (PVC) comprises a plurality of GaAs photodiodes in series, the unit having a high efficiency, e.g. of the order of 0.4 to 0.5.

Figure 1:
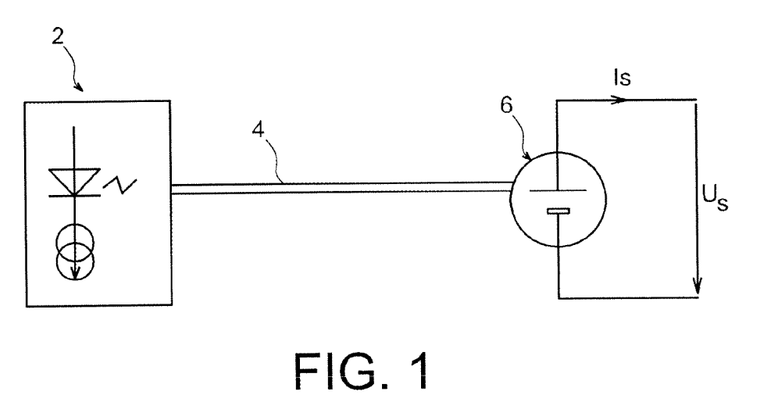
FIG. 1 is a diagram of a laser source that feeds a photovoltaic converter.

FIG. 1 is a diagram showing a laser source (a semiconductor laser) 2 that sends radiation into a fiber 4. That radiation makes it possible to activate a photovoltaic converter disposed at the other end of the fiber 4. That converter delivers a current Is at a voltage Us.

Figure 2A:
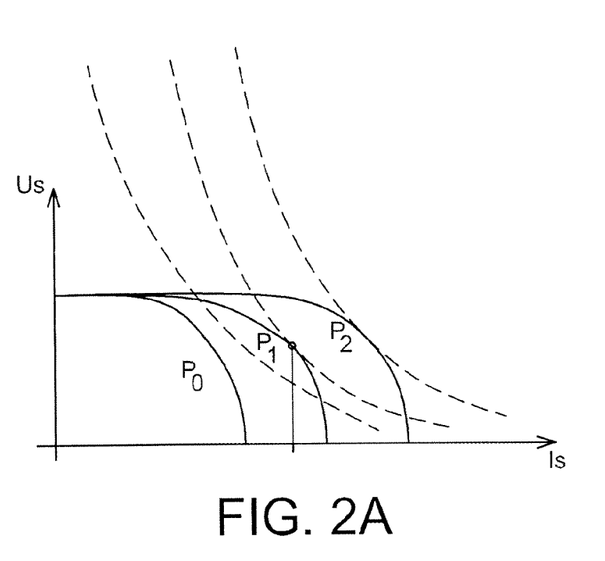
FIGS. 2A and 2B are U-I diagrams of converters.

FIG. 2A is a Us-Is diagram of the converter, each curve corresponding to a given input optical power. The intercept point (Is=0, Us=$U_{s0}$) is the no-load operating voltage of the PVC. In this diagram, three operating curves are shown, each showing the variation of the voltage as a function of current, for respective input optical powers P0, P1, P2 (P0<P1<P2). Curves of equation Us·Is=constant are also shown in dashed lines.

Figure 2B:
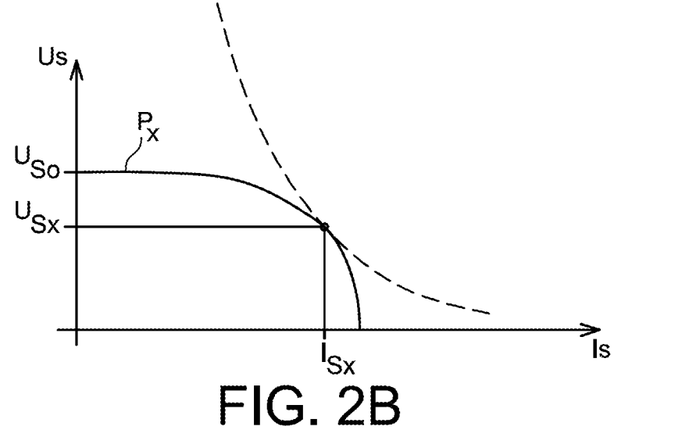

For a given input optical power $P_x$ there exists an operating point for which the efficiency is at a maximum. In FIG. 2B, this point corresponds to the output voltage $U_{sx}$ and to the output current $I_{sx}$.

A first problem is the lifespan of the laser, which should be kept as long as possible.

It is also desirable to optimize the lifespan of the PVC 6, and in particular to minimize its heating, due to the difference between the optical power it receives and the electrical power it delivers.

Figure 3:
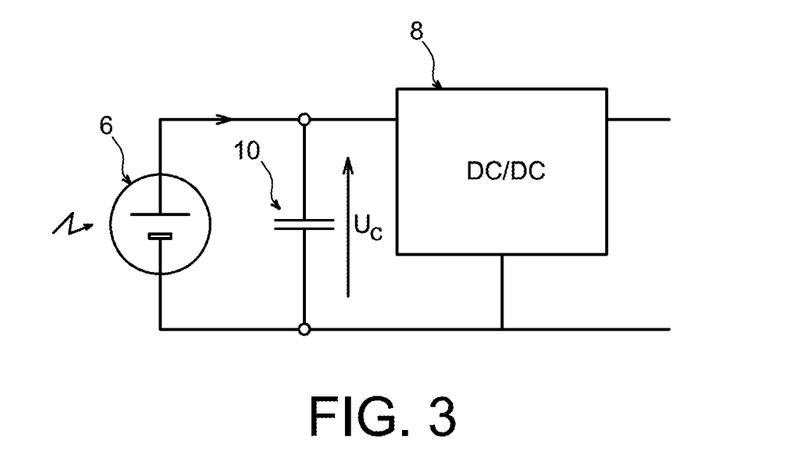
FIG. 3 is the circuit diagram of a connection of a PV converter in a circuit, upstream of a voltage-voltage converter.

FIG. 3 shows diagrammatically connection of a PV converter 6 in a circuit in which a DC/DC power supply converter 8 is connected.

Figure 4:
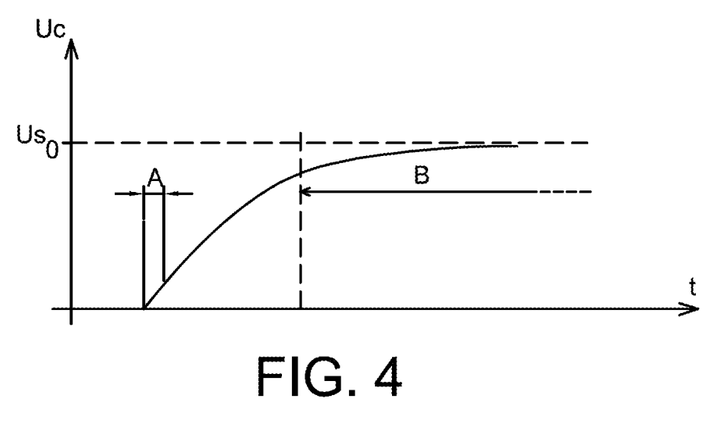
FIG. 4 shows a charging curve of the PV converter of FIG. 3.

A capacitor 10, of capacitance C, is connected to the terminals of the PVC 6. In order to illustrate the problem to be resolved, the following example is considered in which the PVC 6 receives constant optical power Px that is much greater than the electrical power delivered to the load represented by the converter 8. During operation of the system, the charge of the capacitor 10 varies as a function of time as shown in FIG. 4, in order to reach a value close to $U_{s0}$.

The efficiency in zone A (start of the rising voltage curve) is close to zero, since the voltage delivered is very low. In similar manner, the efficiency in zone B (asymptotic zone in which the voltage is close to $U_{s0}$), is close to zero, since the current delivered is very low.

Either way, the main part of the input optical power is converted into heat.

As a result, the temperature of the PVC 6 rises.

In addition, if the capacitance of the capacitor 10 is considerable, which it often is in light-powered systems, its charging time will be much longer than it would be if the PVC 6 operated at maximum efficiency during this charging step.

Finally, this type of operation leads to the laser source 2 being operated at a power level that is pointlessly high, and thus affecting its lifespan.

In order to overcome these drawbacks, it is sought to regulate the system so that the operating point of the PVC 6 is closest to its maximum yield point.

SUMMARY OF THE INVENTION

To this end, the invention provides a device for regulating the supply of a photovoltaic converter, comprising:

a laser source;
a photovoltaic converter, that feeds a converter; and
means for regulating the input impedance of said converter as a function of the operating voltage of the photovoltaic converter and of its no-load voltage.

Means may further be provided for measuring an output voltage of the converter, or a voltage at the output of the converter, and for producing a signal for regulating the laser source.

It is possible to regulate said converter as a function of the operating voltage of the photovoltaic converter and of its no-load voltage.

The means for regulating the input impedance of the converter may comprise means for measuring an operating voltage of the photovoltaic converter and/or means for measuring a voltage that depends on the no-load voltage of the photovoltaic converter.

Switch means may be provided in order to connect and disconnect the means for measuring said operating voltage of the photovoltaic converter.

In an embodiment, means make it possible to compare a voltage that depends on the no-load voltage of the photovoltaic converter with said operating voltage of the photovoltaic converter.

Means may be provided for performing iterative adjustment of the operating point of the converter and of the regulation of the laser source.

By way of example, the voltage may be iteratively adjusted in order to minimize current in the laser supply means. Means may be provided for adding to the voltage, which depends on the no-load voltage of the photovoltaic converter, a voltage that is iteratively adjusted until a best efficiency point is obtained.

In an embodiment, the means for producing a signal for regulating the laser source may comprise means for comparing an output voltage of the voltage converter with at least one threshold value, possibly with two threshold values, and for producing a signal, e.g. signal pulses, for regulating the laser source as a function of the result of the comparison.

Preferably, the following are implemented:
a first type of regulation signal, e.g. pulses of a first type, or at a first frequency, when the output voltage of the voltage converter is greater than a first threshold value;
and/or a second type of regulation signal, e.g. pulses of a second type, or at a second frequency, when the output voltage of the voltage converter is less than a second threshold value.

The regulation signal may reduce or zero the power emitted by the laser, when the output voltage of the voltage converter is greater than a threshold value; it may increase the power emitted by the laser, when the output voltage of the voltage converter is less than a threshold value.

The invention also relates to a method of regulating the supply of a photovoltaic converter that feeds a voltage converter, comprising the following steps:
emitting pulses of radiation from a laser source towards the photovoltaic converter;
regulating the input impedance of said voltage converter as a function of the operating voltage ($U_s$) of the photovoltaic converter and of its no-load voltage ($U_{s0}$).

It is further possible to measure an output voltage of the voltage converter, or a voltage at the output of the converter, and to regulate the laser source as a function of said output voltage.

Regulating the input impedance of the voltage converter may comprise a step of measuring an operating voltage of the photovoltaic converter and/or a step of measuring a voltage that depends on the no-load voltage of the photovoltaic converter.

The regulation of the laser source may include a step of comparing an output voltage of the voltage converter to at least one or two threshold values, and the production of a signal, e.g. signal pulses, for regulating the laser source as a function of the result of the comparison.

It is possible to produce a first type of regulation signal when the output voltage of the voltage converter is greater than a first threshold value, and/or a second type of regulation signal when the output voltage of the voltage converter is less than a second threshold value.

The regulation signal may reduce or zero the power emitted by the laser, when the output voltage of the voltage converter is greater than a threshold value, and/or increase the power emitted by the laser, when the output voltage of the voltage converter is less than a threshold value.

Preferably, the means for producing a signal for regulating the laser source may comprise means for comparing an output voltage of the DC-DC converter with an alarm threshold value, in order to produce an alarm message if said alarm threshold is crossed.

The converter, which may be of the DC-DC type, may for example be of the voltage-voltage, or current-voltage, or voltage-current type.

Such a device may further comprise switch means for disconnecting said DC-DC converter so as to measure the no-load voltage of the photovoltaic converter.

Means for storing energy may be placed at the input and/or at the output of said converter.

The means for measuring an output voltage of the converter may measure a voltage at the terminals of said means for storing energy, placed at the output of said DC-DC converter.

The invention also relates to a method of regulating the supply to a photovoltaic converter that feeds a voltage converter, comprising the following steps:
  emitting pulses of radiation from a laser source towards the photovoltaic converter;
  regulating said converter as a function of the operating voltage of the photovoltaic converter and of its no-load voltage; and
  measuring an output voltage of the converter and regulating the laser source as a function of said output voltage.

Preferably, the input impedance of said DC-DC voltage converter is regulated as a function of the operating voltage of the photovoltaic converter and of its no-load voltage.

In such a method, the regulation of said DC-DC converter may include a step of measuring an operating voltage of the photovoltaic converter.

The regulation of said DC-DC converter may include a step of measuring a voltage that depends on the no-load voltage of the photovoltaic converter.

Iterative adjustment of the operating point of the converter and of the regulation of the laser source may also be performed.

By way of example, the voltage may be adjusted iteratively in order to minimize current in the laser supply means. To the voltage, which depends on the no-load voltage of the photovoltaic converter, is added a voltage that is iteratively adjusted until a best efficiency point is obtained.

The regulation of the laser source may include a step of comparing an output voltage of the DC-DC voltage converter to at least one threshold value or at least two threshold values, and the production of a signal, e.g. signal pulses, for regulating the laser source as a function of the result of the comparison.

By way of example, a first type of regulation signal is produced when the output voltage of the converter is greater than a first threshold value, and/or a second type of regulation signal is produced when the output voltage of the converter is less than a second threshold value.

In an embodiment, the regulation signal reduces or zeroes the power emitted by the laser, when the output voltage of the voltage converter is greater than a threshold value, and/or augments or increases the power emitted by the laser, when the output voltage of the voltage converter is less than a threshold value.

A regulation signal may comprise pulses of a first type, or at a first frequency, when the output voltage of the voltage converter is greater than a threshold value, and/or pulses of a second type, or at a second frequency, when the output voltage of the voltage converter is less than a threshold value.

DETAILED DESCRIPTION OF PARTICULAR EMBODIMENTS

Based on the diagram in FIG. 3, it is sought to servo-control the operating point of the PVC 6 by means of the converter 8 (in this example: DC-DC), which is preferably of the voltage-voltage type. In a variant, it is also possible to use one or more converters of the current-voltage or voltage-current type. The automatic control of the system is so that the input voltage $U_{in}$ of the converter 8 is close to the voltage Usx corresponding to the maximum efficiency point of the PVC 6 (see FIG. 2B).

This optimum voltage $U_{sx}$ may be approximated as being a fraction of the no-load voltage $U_{s0}$, i.e. for example:

$$U_{in} = \alpha U_{s0}, \qquad [1]$$

Initially, the coefficient α may present a fixed value and be placed, in preferred manner, between the values $0.6 < \alpha < 0.95$, by way of further example: $\alpha \approx 0.75$. α is a value that may be deduced from the characteristics of the PVC by using constant-power curves.

In order to apply this condition, $U_{s0}$ is measured and the converter 8 is controlled so that the above-mentioned equality [1] is satisfied.

Figure 5:
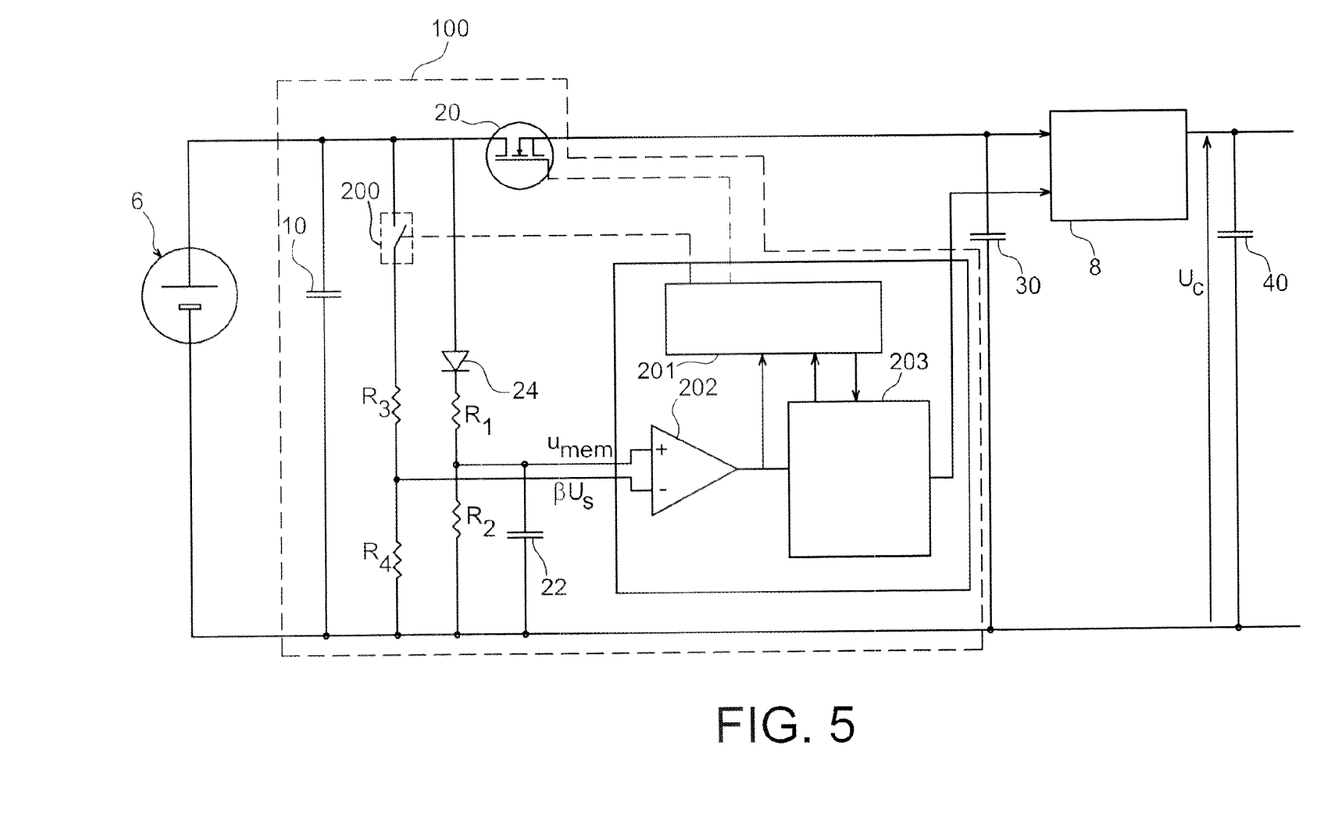
FIG. 5 shows in detailed manner the portion of a circuit of the invention that makes it possible to govern the input voltage of a voltage-voltage converter.

To this end, the circuit shown in FIG. 5 may be used, FIG. 5 showing in particular the elements shown in FIG. 3, having the same references.

In addition, means 20, e.g. a transistor of the JFET or MOSFET type, or even a bipolar PNP type, are placed at the input of the voltage/voltage converter 8. These means 20 perform a switch function so as to disconnect, advantageously cyclically, charging of the PVC 6 in order to measure, preferably regularly, its no-load voltage. This measurement makes it possible to take account of the variation over time of various influencing factors: incident optical power, temperature, aging of components, etc. The control of these means 20 may be performed by an automaton 201 embedded in the circuit powered by the PVC 6. In a preferred embodiment, said automaton is made from a programmable electronic circuit of the FPGA ("field programmable gate array") type, or equivalent, having very low specific consumption.

In order to ensure that the temporary disconnection of the PVC 6 by the means 20 does not have an effect on the circuits connected to the output of the converter 8, a capacitor 30, connected to the input of this last one, provides an energy storage function. A resistor 27 is connected in series with the means 20 so as to limit the amplitude of the current passing therethrough on closing. The presence of the capacitor 30 can indeed generate high inrush currents.

A first voltage divider for dividing the voltage $U_s$, produced by the PVC 6 comprises two resistors $R_3$, $R_4$, and makes it possible, at a point between the resistors $R_3$ and $R_4$, to measure a first voltage proportional to $U_s$, that can be written:

$$\beta \cdot U_s = U_s \cdot R_4/(R_4+R_3).$$

This first divider makes it possible to provide an image of the voltage $U_s$, preferably continuously.

In a variant embodiment, the divider constituted by the resistors $R_3$ and $R_4$ is connected in series with switch means 200, for connecting these resistors only for the length of time required for measuring the voltage $U_s$. Preferably, the control of said means 200 is performed by the same embedded automaton 201 performing the control of the means 20.

A second voltage divider for dividing the voltage $U_s$, produced by the PVC 6, comprises two resistors $R_1$, $R_2$. It further comprises a diode 24 having a very low forward voltage drop, e.g. of the Schottky type; this diode is placed upstream of the two resistors. This second divider makes it possible to sample or measure a second voltage, at a point located between the resistors $R_1$ and $R_2$, which second voltage is substantially equal to: $U_{mem}=(U_s-V_d)R_2/(R_2+R_1)$, Vd representing the voltage drop across the terminals of the diode 24. This voltage $U_{mem}$ can be stored by means of a capacitor 22 connected as shown in FIG. 5, between the mid-point of the resistors $R_1$ and $R_2$ and the common point Vref (=0) of the circuit (see FIG. 5). The diode 24 avoids discharging said capacitance too quickly, e.g. as a result of fluctuations in the voltage $U_s$. This second divider is designed to provide a stable image of the most recent measurement of the no-load voltage. The voltage at the terminals of the capacitor 22 stabilizes at a value equal to $(U_{so}-V_d)R_2/(R_2+R_1)$, i.e. an image of the no-load voltage of the photovoltaic converter 6.

In preferred manner, the converter 8 is a switched mode converter delivering an output voltage that may be modified either by changing its internal switching frequency or else its duty ratio.

By way of example, it is governed by a regulator 203 in such a manner that the voltages $U_{mem}$ and $\beta \cdot U_s$ are equal.

This equality may be tested, preferably continuously, e.g. by means of a voltage comparator 202.

The automatic controlling of the converter 8 that makes it possible to equalize these voltages $\beta \cdot U_s = U_{mem}$:
whence:

$$U_s R_4/(R_4+R_3)=(U_{so}-V_d)R_2/(R_1+R_2)$$

I.e.:

$$U_s=(U_{so}-V_d)\cdot R_2/(R_1+R_2)\cdot(R_3+R_4)/R_4$$

Or indeed:

$$U_s=U_{so}(1-V_d/U_{so})\cdot R_2/(R_1+R_2)\cdot(R_3+R_4)/R_4$$

As explained above, it should be observed that an operating point is sought, such that:

$$U_s=\alpha U_{so}$$

Whence the relationship between the resistors:

$$(1-V_d/U_{so})\cdot R_2/(R_1+R_2)\cdot(R_3+R_4)/R_4=\alpha.$$

This first technique is simple to implement and enables consumption to be low.

In a variant, it is possible to store, for example, in an FPGA, which in preferred manner is the same as that used in the automaton 201, a table giving the operating point, i.e. $\alpha$ as a function of $U_{so}$. This second technique is more accurate, but is more complex to implement.

In a variant, the measurements of $U_s$ and $U_{so}$ may be made by sample-and-hold circuits.

Below, another method is described, which makes it possible to iteratively adjust the value of the coefficient $\alpha$, which serves to determine the best efficiency point, regardless of a priori knowledge of the characteristic of the PVC.

In any event, including in the example described below with iterative adjustment of the value of the coefficient $\alpha$, the operation of the photovoltaic converter 6 is brought into a zone of FIG. 4 in which its efficiency is noticeably better than in zones A and B (in which, it is recalled, it is substantially close to zero).

This regulation is obtained by acting on the input impedance of the converter 8.

However, whatever the selected technique, it does not make it possible to control the output voltage $U_c$ of the converter module 8.

If the power absorbed by the load connected at the output of the converter 8 is too low compared with the incident optical power on the PVC 6, given its efficiency, the output voltage of the converter 8 will increase, being limited only by destruction of the components involved.

In this respect, a capacitor 40 arranged at the output of the converter 8 plays the two roles of providing both safety and storage.

The greater the capacitance of the capacitor 40, the slower, other things remaining equal, will be the variations in the voltage $U_c$ at the output of the converter 8.

In symmetrical manner, if the power absorbed by the load connected at the output of the converter 8 is too great compared with the optical incident power on the PVC 6, in view of its efficiency, the voltage $U_c$ output of the converter 8 will decrease down to zero. In this event also, the capacitor 40 plays a role providing a temporary supply of energy, and slowing down the rates at which the output voltage $U_c$ from the converter 8 varies.

These fluctuations in the voltage $U_c$ reflect the mismatch between the optical power delivered by the laser and the power necessary for operating the equipment for which it serves as a power supply. When these two powers match, the capacitor 40 no longer needs to provide energy, or to stock it. The voltage $U_c$ remains constant.

Figure 6:
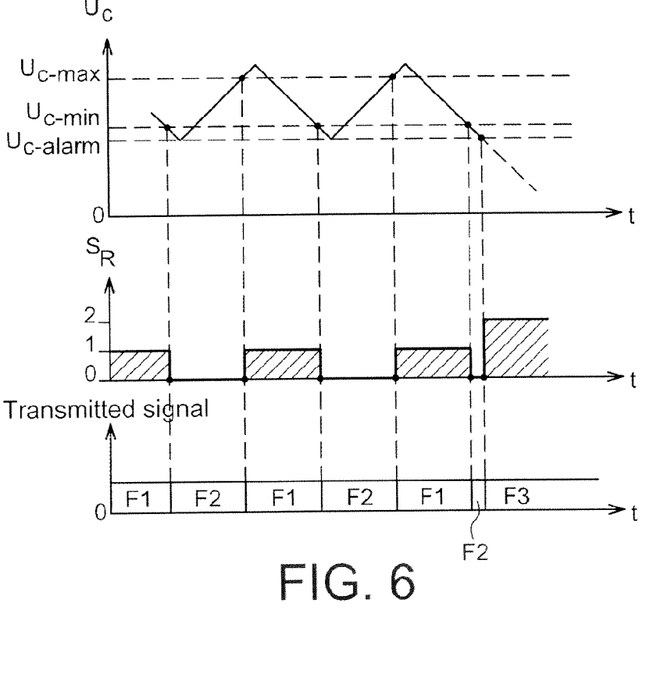
FIG. 6 shows various signals used in a method of regulating the supply to a laser.

Additional photovoltaic cell 6 supply regulation means may therefore be implemented in such a manner as to regulate the voltage $U_c$.

ore particularly, it is possible to implement means for regulating the supply to the laser 2. FIG. 6 shows examples of various signals, as a function of time t, that may be used to perform this regulation.

To this end, the output voltage $U_c$ from the module 8 is measured, which voltage is also the voltage across the terminals of the capacitor 40. When regulation of the supply of the laser 2 is operational, the output voltage $U_c$ from the module 8 remains in the range between two limits $U_{c\_max}$ and $U_{c\_min}$.

If a failure occurs in the regulation loop, e.g. such as a failure of the laser 2, so as to no longer transmit energy to the PVC 6, the voltage $U_c$ may then decrease below the limit value $U_{c\_min}$ and even cross an alarm threshold $U_{c\_alarm}$.

This voltage level $U_{c\_alarm}$ is determined in such a manner that the energy stored in the capacitor 40, associated with the characteristics of the converter 48 to which it is connected, enables the system to continue to operate over a time period that is sufficient for transmitting an alarm message. Such an alarm message is then transmitted.

Figure 7:
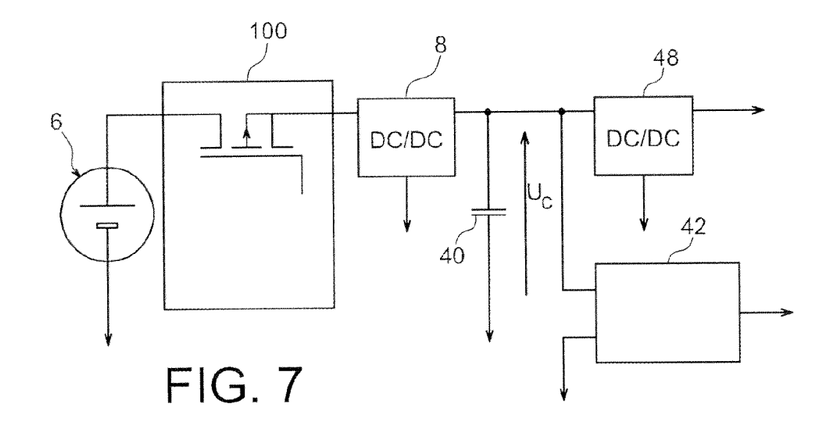
FIG. 7 shows another aspect of a circuit of the invention.

Reference is made to FIG. 7, in which references identical to those of the preceding figure represent the same elements, including the above-described set of means 100. The reference 42 designates a set of means that enable the voltage $U_c$ at the terminals of the storage capacitor 40 to be measured.

By way of example, they are a telemetry module of said voltage.

These means 42 also make it possible to produce a regulation signal $S_R$ from measured voltage values $U_c$.

Figure 8:
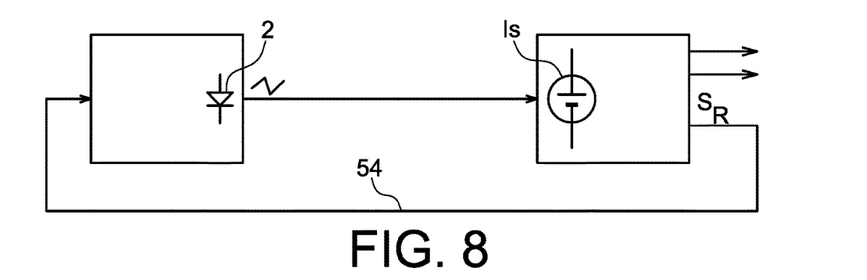
FIG. 8 is a diagram of a servo-mechanism of a laser diode.

This regulation signal may be transmitted to the supply means of the laser 2 via an optical fiber 54 (FIG. 8).

In order to produce the regulation signal, it is possible to define both a high threshold value $S_h$, and a low threshold value $S_b$, such that:

If $U_c > U_{c\_max}$: $S_R = 1$
If $U_c < U_{c\_min}$: $S_R = 0$

A threshold $U_{c\_alarm}$ may also be defined, such that if $U_c < U_{c\_alarm}$: $SR=2$.

A regulation signal is therefore produced whenever the voltage $U_c$ is greater than a high threshold or less than a low threshold. It should be emphasized that these two thresholds are equivalent to hysteresis associated with a regulation at a single threshold. In a variant, regulation means may therefore be provided with a single threshold, and with hysteresis.

In addition, a time period $T_{period}$ may be determined with a value that is determined from time constants of the system, and in particular of the capacitance of the capacitor 40.

The module for governing the laser 2 may be controlled as follows:

1. In a first possibility:
   If $S_R = 1$: the laser is turned off;
   If $S_R = 0$: the laser is activated.
   In addition, if $S_R = 2$, it is possible to implement a maintenance strategy.
   In other words, the laser is controlled in order to emit rays when $S_R = 0$, or when the voltage delivered by the DC/DC converter 8 is less than a threshold value.

2. In a second possibility:
   If $S_R = 1$ (the voltage $U_c$ is greater than a threshold value): thus, the power of the laser is reduced by a given factor, e.g. by 10%. Then, if, beyond a time period equal to $T_{period}$, $S_R$ is still equal to 1, it is possible once more to reduce the power of the laser by the same factor as before. This reduction may be repeated so long as $S_R = 1$ during multiple time periods of $T_{period}$.

If $S_R = 0$ (the voltage $U_c$ is less than a threshold value): the power of the laser is increased by a given factor, e.g. again by 10%. Then, if, beyond a time period equal to $T_{period}$, $S_R$ is still equal to 0, it is possible once more to increase the power of the laser by the same factor as before. This increase may be repeated so long as $S_R = 0$ during multiple time periods of $T_{period}$.

If $S_R = 2$: it is possible to implement a maintenance strategy.

In the absence of a failure, the laser then progressively stabilizes on a power close to optimum power.

This second possibility is optimum, both for the laser 2 and for the PVC 6, while also being safe. It is therefore considered as being preferable.

For reasons of operating safety that appear below, it is desirable not to transmit the signal $S_R$ as produced in the above-mentioned manner directly, but rather to transmit the signal by modulating a carrier signal.

The laser 2 and the equipment associated with the PVC 6 may be relatively far apart from each other.

The optical fiber connections respectively providing transmission of energy from the laser 2 to the PVC 6 and of information for regulating the equipment fed by the PVC 6 to the laser 2 may be interrupted accidentally for multiple reasons (broken connections, equipment failure, etc.).

In one technique, in order to overcome this problem, the information is transmitted using frequency modulation. Even in the absence of a signal to be transmitted, the receiver continues to detect activity on the optical fiber; the absence of activity on the optical fiber is thus the signature of a failure of the connection.

The means 42 therefore transmit a signal $S'_R$ based on the signal $S_R$.

Figure 9A:
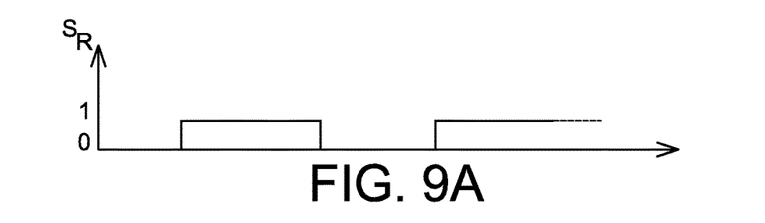
FIGS. 9A-9B are diagrams showing regulation signals for a laser diode.

FIG. 9A shows the signal $S_R$ as elaborated above.

Figure 9B:
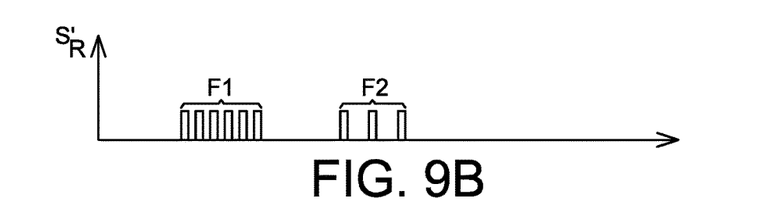

FIG. 9B shows a signal $S'_R$ obtained from the signal $S_R$. In one example, this signal may comprise:

a series of pulses at a first frequency $F_1$, when $S_R = 1$. The detection of this frequency $F_1$ by the reception equipment is interpreted as the need to reduce the power of the laser.

a series of pulses at a second frequency $F_2$, when $S_R = 0$.

Optionally, this signal may comprise a series of pulses at a third frequency $F_3$, when $S_R = 2$.

In a variant, it is possible to use any other protocol for transmitting the information $S_R$ in order to regulate the power of the laser 2.

A loss of laser activity, indicative of a laser operation problem, is therefore detected immediately, and distinguished from a break in the transmission of information, which results in the absence of a signal on the optical fiber.

Finally, the variation of energy $\Delta W$ in the capacitor 40 is given by:

$$\Delta W = \tfrac{1}{2} C (U_f - U_i).$$

The voltages $U_f$ and $U_i$ are respectively slightly greater than $U_{c\_max}$ and slightly less than $U_{c\_min}$, in view of the delay between crossing the thresholds and their effect on regulation.

The electrical power supplied is equal to: $\eta P_o$, where $P_o$ is the optical power supplied.

The energy supplied therefore has the value:

$$\eta P_o (t_f - t_i) = \tfrac{1}{2} C (U_f^2 - U_i^2).$$

And the charging time has the value:

$t_f - t_i = \frac{1}{2} C(U_f^2 - U_i^2)/\eta P_o.$

The capacitor is thus charged in very rapid manner, while letting the PVC 6 heat up as little as possible.

Below, the method is described that makes it possible to iteratively adjust the value of the coefficient α, which serves to determine the best efficiency point, regardless of a priori knowledge of the characteristic of the PV converter.

This method implements at least one device such as the device 100 described above in connection with FIG. 5, the module 8, and the means 42 that make it possible to produce a regulation signal for the laser supply means.

For this purpose, at the input of the voltage comparator circuit 202, means are arranged that make it possible to generate an additional voltage at $U_{mem}$, which may be adjusted gradually and iteratively, until the current in the laser supply means is minimized.

This iterative technique makes it possible to further improve the output of the PV converter 6.

Examples of steps of this technique are as follows:
1. Measuring the output voltage of the photovoltaic converter CPV6, which activates regulation of the current of the laser supply means and which determines a characteristic (Us-Is) of the converter CPV6;
2. Comparing the on-load voltage with the no-load voltage, and complying with the criterion: Us=α·Us0 (a constant), which makes it possible to place a first best efficiency point on the preceding characteristic Us-Is of the converter CPV6, as described above;
3. Adding an additional voltage at the input of the voltage comparator circuit 202, which gives rise to a new adjustment to the laser current, using step 1, and to a new search for the best efficiency point using step 2. A new additional voltage value at the input of the voltage comparator circuit 202 is applied, so as to repeat the above steps 1 and 2 again, and so on, until finally minimizing the current level of the laser supply means.

Initially, it was possible to adjust the current in the laser supply means to a value that enables normal operation of this one, even if the operation is not optimized. This determines a characteristic (Us-Is) of the converter CPV6, and step 2 may be implemented. Iteration is thus initiated.

Figure 10:
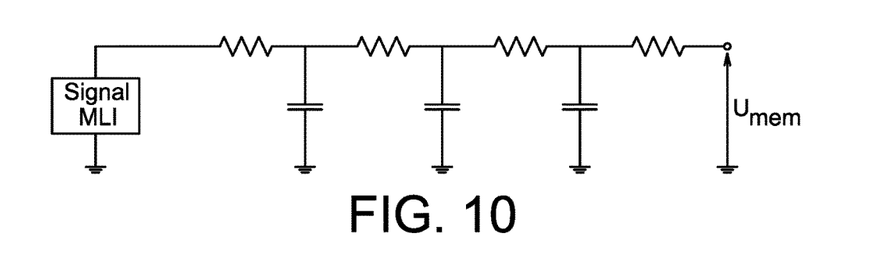
FIG. 10 shows an embodiment of a circuit for automatically adjusting the coefficient α.

An embodiment of a circuit for automatically adjusting the coefficient α is shown in FIG. 10; it makes it possible to superimpose a signal on the voltage $U_{mem}$, which signal comes from a circuit of the "R-C charge pump" type, excited by pulse width modulation (PWM); various duty ratio values make it possible to gradually adjust the voltage level that is directly added to the signal $U_{mem}$. Preferably, these means are controlled by the same embedded automaton 201 as controls the means 20. In general, any other embodiment that consists in superposing pre-recorded voltage levels to the voltage $U_{mem}$ would also be applicable.

What is claimed is:

1. A device for regulating the supply to a photovoltaic converter, the device comprising:
   a laser source;
   a photovoltaic converter that feeds a DC-DC converter;
   a DC-DC converter regulator, said regulator regulating said DC-DC converter as a function of an operating voltage of the photovoltaic converter and of a no-load voltage of the photovoltaic converter; and
   a DC-DC converter output voltage measuring device, said output voltage measuring device producing a regulation signal to regulate the laser source.

2. A device according to claim 1, wherein the input impedance of said DC-DC converter is regulated as a function of the operating voltage of the photovoltaic converter and of the no-load voltage of the photovoltaic converter.

3. A device according to claim 1, wherein the regulator of the DC-DC converter comprise a circuit measuring an operating voltage of the photovoltaic converter.

4. A device according to claim 3, further comprising a switch for connecting and disconnecting the circuit measuring said operating voltage of the photovoltaic converter.

5. A device according to claim 1, the regulator of the DC-DC converter comprising a circuit to measure an operating voltage that depends on the no-load voltage of the photovoltaic converter.

6. A device according to claim 1, further comprising a comparator comparing a voltage that depends on the no-load voltage of the photovoltaic converter with said operating voltage of the photovoltaic converter.

7. A device according to claim 1, said device performing iterative adjustment of the operating point of the DC-DC converter and of the regulation of the laser source.

8. A device according to claim 7, said device iteratively adjusting a voltage so as to minimize current in the laser power supply means.

9. A device according to claim 6, said device further adding to the voltage, which depends on the no-load voltage of the photovoltaic converter, a voltage that is iteratively adjusted until a best efficiency point is obtained.

10. A device according to claim 1, wherein said output voltage measuring device comprises a comparator of an output voltage of the DC-DC converter with at least one threshold value.

11. A device according to claim 10, wherein a first type of regulation signal is implemented when the output voltage of the DC-DC converter is greater than first threshold value, and/or a second type of regulation signal is implemented when the output voltage of the DC-DC converter is less than a second threshold value.

12. A device according to claim 10, wherein the regulation signal reduces or zeroes the power emitted by the laser, when the output voltage of the DC-DC converter is greater than a threshold value, and/or increases the power emitted by the laser, when the output voltage of the DC-DC converter is less than a threshold value.

13. A device according to claim 10, wherein the output voltage of the DC-DC converter is compared with at least two threshold values.

14. A device according to claim 10, wherein the regulation signal is a signal made up of pulses.

15. A device according to claim 14, wherein the regulation signal comprises pulses of a first type, or at a first frequency, when the output voltage of the DC-DC converter is greater than a threshold value, and/or pulses of a second type, or at a second frequency, when the output voltage of the DC-DC converter is less than a threshold value.

16. A device according to claim 10, wherein said output voltage measuring device comprises a comparator of an output voltage of the DC-DC converter with an alarm threshold value, in order to produce an alarm message if said alarm threshold is crossed.

17. A device according to claim 1, wherein the DC-DC converter is of the voltage-voltage, or current-voltage, or voltage-current type.

18. A device according to claim 1, further comprising a switch disconnecting said DC-DC converter so as to measure the no-load voltage of the photovoltaic converter.

19. A device according to claim 1, further comprising at least an energy storage, placed at the input of said DC-DC converter or at the output of said DC-DC converter.

20. A device according to claim 19, said measuring device measuring a voltage at the terminals of an energy storage, placed at the output of said DC-DC converter.

21. A method of regulating the supply to a photovoltaic converter that feeds a DC-DC converter, comprising the following steps:
  emitting pulses of radiation from a laser source towards the photovoltaic converter;
  regulating said DC-DC converter as a function of an operating voltage of the photovoltaic converter and of a no-load voltage of the photovoltaic converter;
  measuring an output voltage of the DC-DC converter and regulating the laser source as a function of said output voltage.

* * * * *